(12) United States Patent
Williams et al.

(10) Patent No.: US 6,692,158 B2
(45) Date of Patent: Feb. 17, 2004

(54) METHOD AND APPARATUS FOR PROVIDING CLEARANCE FOR A BALL BEARING OUTER RACE

(75) Inventors: Timothy O. Williams, Fort Wayne, IN (US); Michael A. Cook, Silver Lake, IN (US); Michael W. Henry, Fort Wayne, IN (US); Timothy W. Carey, Grabill, IN (US)

(73) Assignee: General Electric Company, Schenectady, NY (US)

( * ) Notice: Subject to any disclaimer, the term of this patent is extended or adjusted under 35 U.S.C. 154(b) by 15 days.

(21) Appl. No.: 10/104,176

(22) Filed: Mar. 22, 2002

(65) Prior Publication Data

US 2003/0179968 A1 Sep. 25, 2003

(51) Int. Cl.[7] .......................... F16C 19/02; F16C 43/04
(52) U.S. Cl. ..................................... 384/537; 29/898.07
(58) Field of Search ................... 384/510, 520, 384/537, 517, 551, 559, 563, 564, 584, 585; 310/89, 90, 91; 29/898.06, 898.07, 898.09

(56) References Cited

U.S. PATENT DOCUMENTS

| | | | | |
|---|---|---|---|---|
| 2,858,174 A | * | 10/1958 | Mitchell | 384/495 |
| 3,701,911 A | * | 10/1972 | Hallerback | 310/60 R |
| 4,632,576 A | * | 12/1986 | Neal | 384/537 |
| 4,640,632 A | * | 2/1987 | Brandenstein et al. | 384/537 |
| 4,888,862 A | * | 12/1989 | Brandenstein et al. | 29/898.054 |
| 2001/0022871 A1 | * | 9/2001 | Buchheim et al. | 384/537 |

* cited by examiner

Primary Examiner—Thomas R. Hannon
(74) Attorney, Agent, or Firm—Karl A. Vick, Esq.; Armstrong Teasdale LLP

(57) ABSTRACT

A bearing seat includes a cylindrical scat defining a cylindrical pocket for at least partially containing a bearing. The cylindrical seat includes a cylindrical first wall and an end wall extending from the cylindrical first wall. The cylindrical first wall has an inner face and the end wall includes an integral shim extending outwardly therefrom. The integral shim is configured to contact a side of an outer race of a bearing such that the side of the outer race of the bearing seats firmly against the integral shim.

26 Claims, 2 Drawing Sheets

METHOD AND APPARATUS FOR PROVIDING CLEARANCE FOR A BALL BEARING OUTER RACE

BACKGROUND OF THE INVENTION

This invention relates generally to bearings and more particularly to cylindrical bearing pockets.

Cylindrical bearings typically require proper diametrical clearance between the outer race of the bearing and the cylindrical bearing pocket in which the bearing rests. To ensure proper pre-loading of the bearing, the clearance must be large enough to allow the bearing to slide axially in the bearing pocket. However, the clearance between the outer race of the bearing and the bearing pocket must also be small enough to restrict side to side movement and rotation of the bearing, which may cause unwanted noise or premature failure of the bearing due to "pound-out."

Cylindrical bearing pockets are typically stamped from thin sheets of steel into a stamped steel "cap and can" construction. The stamped steel "cap and can" construction is capable of maintaining the proper cylindrical shape throughout most of the bearing pocket. However, the diameter at the bottom of the pocket is often too small thereby inhibiting axial motion of the bearing within the bearing pocket. Because the bearing cannot seat firmly against the bottom of the pocket, the bearing may become pinched and thus may not slide freely within the pocket. Therefore, some bearing pockets are enlarged with a secondary finishing process, such as machining. Machining, however, adds additional cost to the manufacture of the bearing pocket and may also raise quality issues. Roller-burnishing processes have also been used to enlarge the diameter at the bottom of the bearing pocket but are disadvantageous because other areas of the bearing pocket will also be enlarged, possibly becoming oversized. In addition, roller burnishing adds considerable cost to the manufacture of the bearing pocket. Separate spacers or shims have also been employed to address the clearance between the bearing pocket and the outer race of the bearing. Including extra spacers or shims is problematic because of the increased number of parts, manufacturing complexity and cost. Further, extra spacers or shims increase the possibility of improper assembly. For example, the spacer or shim may not be included in the bearing pocket assembly.

BRIEF DESCRIPTION OF THE INVENTION

In one aspect, a bearing seat is provided that comprises a cylindrical seat defining a cylindrical pocket for at least partially containing a bearing. The cylindrical seat includes a cylindrical first wall and an end wall extending from the cylindrical first wall. The cylindrical first wall has an inner face and the end wall includes an integral shim extending outwardly therefrom. The integral shim is configured to contact a side of an outer race of a bearing such that the side of the outer race of the bearing seats firmly against the integral shim.

In another aspect, a cap and bearing assembly is provided which comprises a bearing that includes an outer race. The outer race includes a side. The assembly further comprises a cap that includes a cylindrical seat that defines a cylindrical pocket for at least partially containing a bearing. The cylindrical seat includes a cylindrical first wall and an end wall that extends from the cylindrical first wall. The cylindrical first wall includes an inner face and the end wall includes an integral shim that extends outwardly from the end wall. The integral shim is configured to contact the side of the outer race of the bearing such that the side of the outer race of the bearing seats firmly against the integral shim.

In yet another aspect, a method is provided for locating a bearing within a cylindrical seat. The bearing includes an outer race having a side and the cylindrical seat includes a cylindrical first wall and an end wall. The method comprises providing an integral shim that extends outwardly from the end wall of the cylindrical seat, and disposing the bearing within the cylindrical seat such that the side of the outer race of the bearing seats firmly against the integral shim.

DETAILED DESCRIPTION OF THE INVENTION

Figure 1:
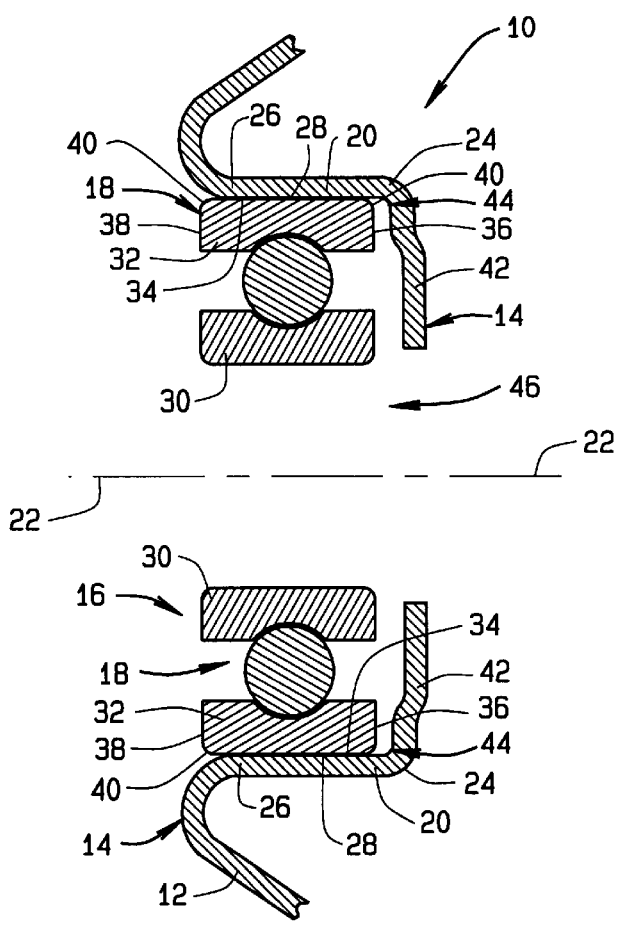
FIG. 1 is a cross-section of a conventional cap and bearing assembly.

Referring now to the drawings, and in particular to FIG. 1, a known cap and bearing assembly 10 comprises a cap, or endshield, 12 for an electric motor (not shown). Cap 12 includes a cylindrical bearing seat 14 that defines a cylindrical bearing pocket 16, which contains a ball bearing 18. Bearing seat 14 includes a cylindrical first wall 20 having a central axis 22 extending through the length thereof, a first end 24, a second end 26 and an inner face 28. Bearing 18 rests within cylindrical bearing pocket 16 and includes an inner race 30 and an outer race 32. Inner face 28 defines the inner diameter of first wall 20 and an outer face 34 of outer race 32 defines the outer diameter of bearing 18. Outer race 32 includes a first side 36 and a second side 38. The intersections of outer face 34 with first side 36 and second side 38 are rounded 40 due to manufacturing procedures. Bearing seat 14 further includes a second wall, or end wall, 42 extending from first end 24 of first wall 20. End wall 42 faces generally perpendicular to central axis 22 and the intersection of end wall 42 with first wall 20 includes a fillet 44 due to manufacturing procedures. In one embodiment, fillet 44 has a maximum radius of 0.03 inches. End wall 42 includes an annular opening 46 concentric with central axis 22.

Figure 2:
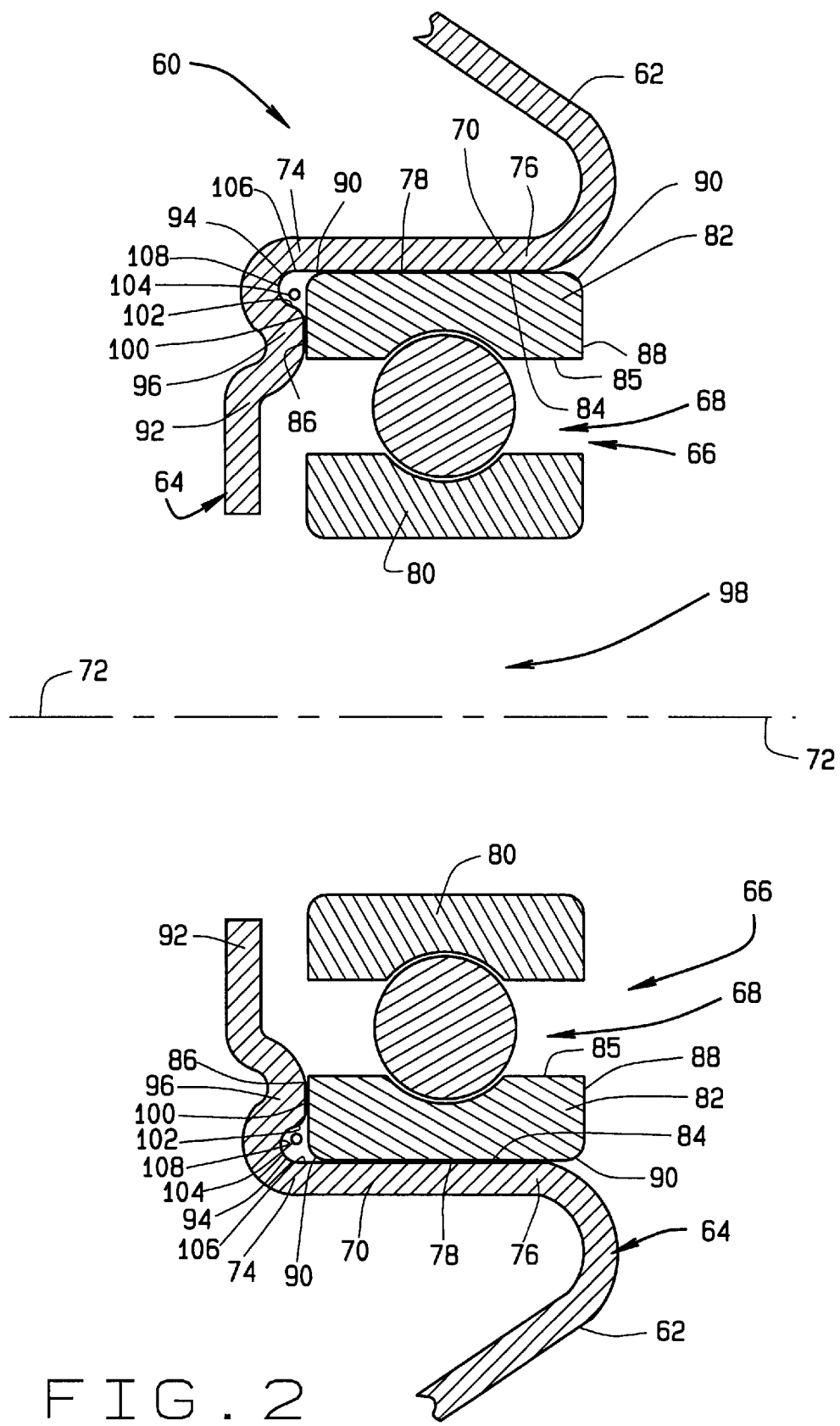
FIG. 2 is a cross-section of one embodiment of the cap and bearing assembly of the present invention.

FIG. 2 illustrates one embodiment of a cap and bearing assembly 60 comprising a cap 62 for an electric motor (not shown). Cap 62 includes a cylindrical bearing seat 64 that defines a cylindrical bearing pocket 66, which contains a ball bearing 68. In an alternative embodiment, bearing 68 may be a roller bearing or other type of bearing. Bearing seat 64 includes a cylindrical first wall 70 having a central axis 72 extending through the length thereof, a first end 74, a second end 76 and an inner face 78. Bearing 68 rests within cylindrical bearing pocket 66 and includes an inner race 80 and an outer race 82. Inner face 78 defines the inner diameter of first wall 70 and an outer face 84 of outer race 82 defines the outer diameter of bearing 68. Outer race 82 includes outer face 84, an inner face 85, a first side 86, and a second side 88. In one embodiment, shown in FIG. 2, the intersections of outer face 84 with first side 86 and second side 88 are rounded 90 due to manufacturing procedures. In one embodiment, round 90 has a corner radius of 0.079/0.024 inches.

Bearing seat 64 further includes a second wall, or end wall, 92 extending from first end 74 of first wall 70. End wall 92 faces generally perpendicular to central axis 72 and the intersection of end wall 92 with first wall 70 includes a fillet 94. In one embodiment, fillet 94 has a radius that is less than one-half of a thickness between inner face 85 and outer face 84 of outer race 82. End wall 92 includes an integral shim 96, described in further detail below, that extends outwardly from end wall 92 toward bearing 68 and second end 76 of first wall 70. End wall 92 further includes a circular opening 98 concentric with central axis 72 for accommodating a rotor shaft (not shown) of an electric motor.

The clearance between bearing 68 and first wall 70 must be sufficiently large to allow bearing 68 to slide within bearing seat 64 and bearing pocket 66 along central axis 72, thus allowing proper pre-loading of bearing 68. However, the clearance between bearing 68 and first wall 70 must also be sufficiently small to prevent bearing 68 from rotating within bearing seat 64 and to prevent bearing 68 from wobbling within bearing seat 64 perpendicularly to central axis 72. Eliminating rotation and wobbling of bearing 68 significantly reduces bearing noise and premature failure of bearing 68 due to "pound out." In one embodiment, the outer diameter of bearing 68 is slightly smaller than the inner diameter of first wall 70 such that there is a clearance of 0.0011 inches between inner face 78 of first wall 70 and outer face 84 of outer race 82. In another embodiment, the clearance between inner face 78 and outer face 84 is between 0.0011 inches and 0.0020 inches. Alternatively, it will be understood that the clearance between inner face 78 and outer face 84 may be any distance that allows bearing 68 to slide within bearing seat 64 and bearing pocket 66 along central axis 72, and prevents bearing 68 from unwanted rotation and wobble.

In one embodiment, bearing seat 64, including integral shim 96, is an integral piece that is stamped out of steel. Alternatively, it will be understood that in other embodiments bearing seat 64 may be stamped from other suitable metals. For example, in one embodiment, bearing seat 64 is stamped from aluminum.

Referring now to FIGS. 1 and 2, the stamping process is capable of forming cylindrical first walls 20, 70 into the shape and diameter that provides the proper clearance, discussed above, between outer faces 34, 84 and cylindrical first walls 20, 70 respectively. However, the stamping process cannot produce the shape and diameter that provides the proper clearance at the intersection of cylindrical first walls 20, 70 and end walls 42, 92, respectively. Rather, the stamping process produces fillets 44, 94. Referring now to FIG. 1, fillet 44 reduces the diameter of first end 24 of cylindrical first wall 20 thereby inhibiting axial motion of bearing 18 along central axis 22. Further, because the diameter of fillet 44 is greater than the diameter of round 40, when bearing 18 is pre-loaded such that first side 36 of outer race 32 contacts fillet 44, bearing 18 may become pinched within cylindrical first wall 20. Thus, the central axis (not shown) of bearing 18 will no longer be concentrically aligned with central axis 22. Pinching of bearing 18 restricts bearing 18 from sliding freely within bearing seat 14 and bearing pocket 16 along central axis 22. In addition, pinching of bearing 18 may inhibit proper rotation of inner race 30 of bearing 18 thereby causing operational failure of bearing 18.

Referring now to FIG. 2, integral shim 96 spaces bearing 68 away from end wall 92, and thus fillet 94, and provides a uniform seating surface 100 for first side 86 of outer race 82 to contact. Integral shim 96 includes seating surface 100 and a first side 102, and is separated from cylindrical first wall 70 by a trough 104. Trough 104 is defined by first side 100 of integral shim 96, an end portion 106 of inner face 78 of first wall 70, and a bottom 108 that is a portion of end wall 92. Integral shim 96 spaces bearing 68 away from bottom 108 at a distance such that outer race 82 does not contact fillet 94. Therefore, the proper clearance between outer face 84 of outer race 82 and inner face 78 of first wall 70 is maintained throughout the axial length of bearing 68. In one embodiment, shown in FIG. 2, seating surface 100 of integral shim 96 is spaced 0.040 inches from bottom 108 of trough 104, and thus integral shim 96 spaces first side 86 of outer race 82 0.040 inches from bottom 108. Alternatively, seating surface 100 of integral shim 96 may be spaced from bottom 108 at a distance other than 0.040 inches. It will be understood that the distance that seating surface 100 of integral shim 96 is spaced from bottom 108, and thus the distance that integral shim 96 spaces first side 86 from bottom 108, will depend on the application and capability of the manufacturing process forming bearing seat 64. In one embodiment, integral shim 96 is annularly, or ring, shaped and is concentric with first wall 70. Alternatively, in another embodiment, integral shim 96 is annularly shaped and is not concentric with first wall 70. Furthermore, it will be understood by one skilled in the art that integral shim 96 may be any shape that provides a uniform surface, such as seating surface 100, for first side 86 of outer race 82 to contact and spaces bearing 68 away from bottom 108 at a distance such that outer race 82 does not contact fillet 94. For example, in one embodiment, integral shim 96 comprises a plurality of extensions that extend outwardly from bottom 108 toward second end 76 of first wall 70.

By maintaining the proper clearance between outer face 84 of outer race 82 and inner face 78 of first wall 70, and by providing a secure surface 100 for first side 86 of outer race 82 to firmly seat against, the present invention prevents wobble, rotation and pinching of bearing 68. The present invention thus eliminates unwanted noise and premature failure due to "pound out" thereby greatly improving the quality of cap and bearing assembly 60. Also, because shim 96 is an integral part of bearing seat 64, no additional parts are required thus reducing the cost of bearing seat 64 and cap and bearing assembly 60. Integral shim 96 further reduces the cost of bearing seat 64 and cap and bearing assembly 60 by eliminating the need for subjective and time-consuming inspection of the intersection of first wall 70 and end wall 92.

Figure 3:
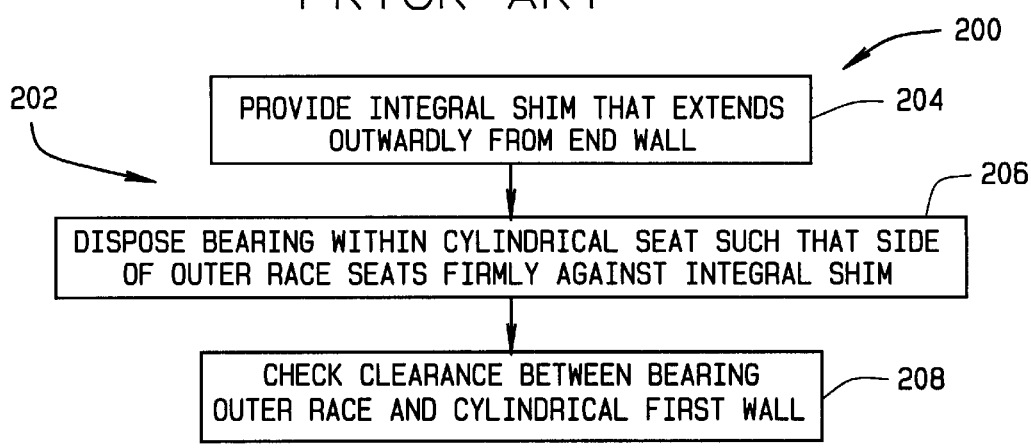
FIG. 3 is a flow chart illustrating the steps for locating a bearing within a cylindrical seat.

FIG. 3 is a flowchart 200 illustrating a method 202 for locating bearing 68 (shown in FIG. 2) within bearing seat 64 (shown in FIG. 2) and bearing pocket 66 (shown in FIG. 2). The method includes providing 204 an integral shim 96 (shown in FIG. 2) that extends outwardly from end wall 92 (shown in FIG. 2), and disposing 206 bearing 68 within bearing seat 64 and bearing pocket 66 such that first side 86 (shown in FIG. 2) of outer race 82 (shown in FIG. 2) seats firmly against integral shim 96. The clearance between first side 86 of outer race 82 and cylindrical first wall 70 of bearing seat 64 is checked 208 to ensure that outer race 82 of bearing 68 cannot rotate and/or wobble within cylindrical bearing seat 64 when bearing 68 is pre-loaded. Clearance check 206 also ensures that bearing 68 can slide within cylindrical bearing seat 64 along central axis 72 before bearing 68 is pre-loaded, such that bearing 68 will not become pinched when bearing 68 is pre-loaded.

While the invention has been described in terms of various specific embodiments, those skilled in the art will recognize that the invention can be practiced with modification within the spirit and scope of the claims.

What is claimed is:

1. A bearing seat comprising:
   a cylindrical seat defining a cylindrical pocket for at least partially containing a bearing, said cylindrical seat including a cylindrical first wall and an end wall extending from said cylindrical first wall;
   said cylindrical first wall having an inner face, said end wall including an integral shim extending outwardly therefrom; and said integral shim configured to contact a side of an outer race of a bearing such that the side of the outer race of the bearing seats firmly against said integral shim.

2. A bearing seat in accordance with claim 1 wherein said end wall includes a circular opening concentric with said cylindrical first wall.

3. A bearing seat in accordance with claim 1 wherein said cylindrical first wall further comprises a first end, a second end and a central axis extending through the length thereof, said end wall extending from said first end of said cylindrical first wall generally perpendicular to said central axis.

4. A bearing seat in accordance with claim 3 wherein said end wall includes an inner face and an outer face, said inner face facing towards said second end of said cylindrical first wall and said outer face facing away from said second end of said cylindrical first wall, said integral shim extending outwardly from said end wall towards said second end of said cylindrical first wall.

5. A bearing seat in accordance with claim 1 wherein said integral shim annularly shaped.

6. A bearing seat in accordance with claim 5 wherein said integral shim concentric with said cylindrical first wall.

7. A bearing seat in accordance with claim 1 wherein said integral shim includes a seating surface and a first side, said seating surface configured to contact the side of the outer race of the bearing such that the side of the outer race of the bearing seats firmly against said seating surface.

8. A bearing seat in accordance with claim 7 wherein said integral shim spaced from said cylindrical first wall by a trough, said trough defined by said first side of said integral shim, at least a portion of said inner face of said cylindrical first wall, and a bottom that comprises at least a portion of said end wall.

9. A bearing seat in accordance with claim 8 wherein said integral shim extends outwardly at least 0.040 inches from said bottom such that said seating surface is spaced at least 0.040 inches from said bottom.

10. A bearing seat in accordance with claim 1 wherein said integral shim comprises a plurality of extensions that extend outwardly from said end wall toward the side of the outer race of the bearing.

11. A cap and bearing assembly comprising:
    a bearing having an outer race, said outer race including a side; and
    a cap for an electric motor, said cap comprising a cylindrical seat defining a cylindrical pocket for at least partially containing said bearing, said cylindrical seat including a cylindrical first wall and an end wall extending from said cylindrical first wall, said cylindrical first wall having an inner face, said end wall including an integral shim extending outwardly from said end wall, said integral shim configured to contact said side of said outer race of said bearing such that said side of said outer race of said bearing seats firmly against said integral shim.

12. A cap and bearing assembly in accordance with claim 11 wherein said cylindrical first wall further comprises a first end, a second end and a central axis extending through the length thereof, said end wall extending from said first end of said cylindrical first wall generally perpendicular to said central axis.

13. A cap and bearing assembly in accordance with claim 12 wherein said end wall includes an inner face and an outer face, said inner face facing towards said second end of said cylindrical first wall and said outer face facing away from said second end of said cylindrical first wall, said integral shim extending outwardly from said end wall towards said second end of said cylindrical first wall.

14. A cap and bearing assembly in accordance with claim 11 wherein said bearing is a ball bearing.

15. A cap and bearing assembly in accordance with claim 11 wherein said bearing is a roller bearing.

16. A cap and bearing assembly in accordance with claim 11 wherein said end wall includes a circular opening concentric with said cylindrical first wall.

17. A cap and bearing assembly in accordance with claim 11 wherein said integral shim annularly shaped.

18. A cap and bearing assembly in accordance with claim 17 wherein said integral shim concentric with said cylindrical first wall.

19. A cap and bearing assembly in accordance with claim 11 wherein said integral shim includes a seating surface and a first side, said seating surface configured to contact said side of said outer race of said bearing such that said side of said outer race of said bearing seats firmly against said seating surface.

20. A cap and bearing assembly in accordance with claim 19 wherein said integral shim spaced from said cylindrical first wall by a trough, said trough defined by said first side of said integral shim, at least a portion of said inner face of said cylindrical first wall, and a bottom that comprises at least a portion of said end wall.

21. A cap and bearing assembly in accordance with claim 20 wherein said integral shim extends outwardly at least 0.040 inches from said bottom such that said seating surface is spaced at least 0.040 inches from said bottom.

22. A cap and bearing assembly in accordance with claim 11 wherein said integral shim comprises a plurality of extensions that extend outwardly from said end wall toward said side of said outer race of said bearing.

23. A method for locating a bearing within a cylindrical seat, the bearing including an outer race having a side, the cylindrical seat including a cylindrical first wall and an end wall, the method comprising:
    providing an integral shim extending outwardly from the end wall of the cylindrical seat; and
    disposing the bearing within the cylindrical seat such that the side of the outer race of the bearing seats firmly against the integral shim.

24. A method in accordance with claim 23 wherein disposing the bearing within the cylindrical seat further comprises checking the clearance between the side of the bearing outer race and the cylindrical first wall to ensure that the bearing outer race cannot rotate within the cylindrical seat when the bearing is pre-loaded.

25. A method in accordance with claim 23 wherein disposing the bearing within the cylindrical seat further comprises checking the clearance between the side of the bearing outer race and the cylindrical first wall to ensure that the bearing cannot wobble within the cylindrical seat when the bearing is pre-loaded.

26. A method in accordance with claim 23 wherein the cylindrical first wall includes a central axis extending through the length thereof and disposing the bearing within the cylindrical seat further comprises checking the clearance between the side of the bearing outer race and the cylindrical first wall to ensure that the bearing can slide within the cylindrical seat along the central axis before the bearing is pre-loaded such that the bearing will not become pinched when the bearing is pre-loaded.

* * * * *

UNITED STATES PATENT AND TRADEMARK OFFICE
CERTIFICATE OF CORRECTION

PATENT NO. : 6,692,158 B2
DATED : February 17, 2004
INVENTOR(S) : Williams et al.

It is certified that error appears in the above-identified patent and that said Letters Patent is hereby corrected as shown below:

Column 5,
Line 26, delete "scats" and insert -- seats --.

Column 6,
Line 11, delete "shim annularly" and insert -- shim is annularly --.
Line 13, delete "shim concentric" and insert -- shim is concentric --.

Signed and Sealed this

Tenth Day of January, 2006

JON W. DUDAS
*Director of the United States Patent and Trademark Office*